United States Patent [19]
Kellett

[11] 3,933,368
[45] Jan. 20, 1976

[54] LEVELLING VALVES
[75] Inventor: John Anthony Kellett, Birmingham, England
[73] Assignee: Girling Limited, Birmingham, England
[22] Filed: Sept. 23, 1974
[21] Appl. No.: 508,165

[52] U.S. Cl. ............................ 280/124 F; 267/65 D
[51] Int. Cl.² ................. B60G 17/04; F16K 11/16
[58] Field of Search ............... 280/124 F; 267/65 D; 137/627.5; 251/21 D

[56] References Cited
UNITED STATES PATENTS
2,967,547  1/1961  Pribonic ........................ 280/124 X
2,970,614  2/1961  Christensen .................... 280/124 X
3,635,460  1/1972  Shilton ........................... 267/65 D Primary Examiner—Philip Goodman
Attorney, Agent, or Firm—Scrivener Parker Scrivener and Clarke

[57] ABSTRACT

A levelling valve for a vehicle suspension system comprises an inlet valve and an exhaust valve for respectively controlling the flow of pressure fluid from an inlet to an intermediate chamber and from the intermediate chamber to exhaust. A valve operting device includes a movable member arranged to operate each of the valves, the movable member being pivotable with respect to valve operating members of the valves, pivotal movement of the movable member with respect to one valve member effecting movement of the other valve member to a valve open position.

15 Claims, 4 Drawing Figures

LEVELLING VALVES

This invention relates to levelling valves for use in suspension system of vehicles.

Levelling valves are normally mounted on either the sprung or unsprung part of a vehicle, usually the sprung part, with a linkage connecting an operating member of the valve to the other part of the vehicle. When there is relative movement between the vehicle parts, due to loading or unloading of the vehicle, the linkage actuates the operating member and the valve is operated to increase or decrease the fluid pressure in the vehicle suspension structs so that the sprung and unsprung parts are restored to their normal relative positions.

In accordance with the present invention, there is provided a levelling valve for a vehicle suspension system, comprising an inlet valve for controlling the flow of pressure fluid from an inlet to an intermediate chamber adapted to be connected to a vehicle suspension member, an exhaust valve for controlling the flow of pressure fluid from the intermediate chamber, and valve operating means including a movable member arranged to operate each of the valves, the movable member being pivotable with respect to valve operating members of the respective valves, such pivoting with respect to one valve member effecting movement of the other valve member to a valve open position.

Two embodiments of a levelling valve in accordance with the invention for a vehicle suspension system will now be described, by way of example, with reference to the accompanying drawings, in which.

Figure 1:
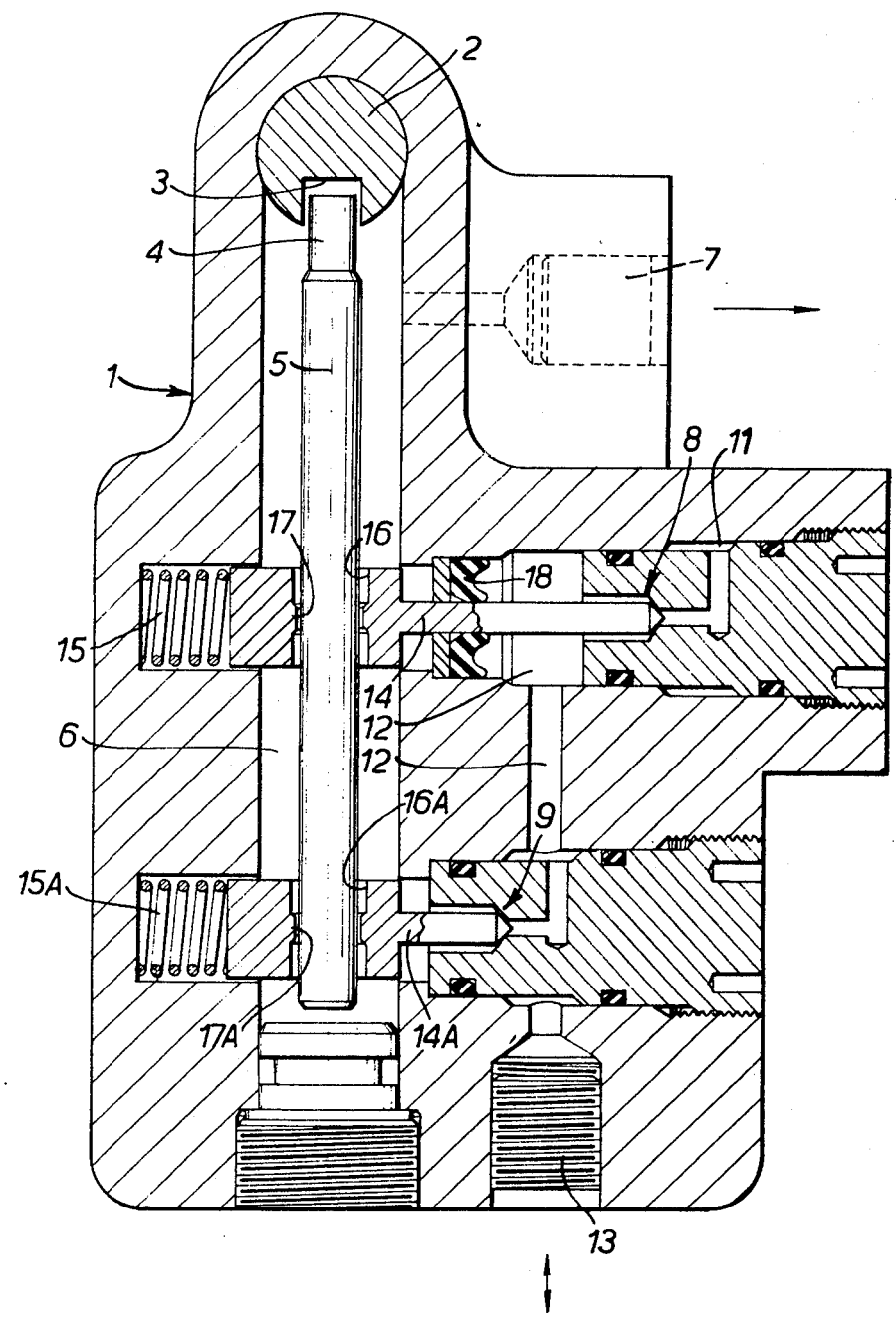
FIG. 1 is an axial cross-section of one embodiment.

The valve of FIG. 1 comprises a housing 1 in which an operating spindle 2 is sealingly and rotatably mounted. The spindle 2 has a recess 3 which receives a reduced diameter portion 4 of a rockable spindle 5 housed within an exhaust chamber 6, which in use communicates through an outlet port 7 with a fluid reservoir (not shown). The rockable spindle 5 is arranged to operate needle inlet and exhaust valves 8 and 9, the inlet valve 8 controlling the flow of pressure fluid between an inlet chamber 11 communicating in use with a primary accumulator or other pressure source (not shown) and, through an intermediate chamber 12, with a port 13 connected in use to the vehicle suspension struts. The exhaust valve 9 controls the flow of pressure fluid between the port 13 and the exhaust chamber 6.

Each of the needle valves 8, 9 comprises a needle valve member 14, 14A which is biased towards its valve seat by a coil compression spring 15, 15A, the valve member having an aperture 16, 16A and an annular projection 17, 17A intermediate the ends of the aperture. The rockable spindle 5 passes with clearance through the apertures 16, 16A.

When the spindle 5 is rotated anti-clockwise as seen in the drawing it pivots on projection 17A of valve 9 and slides the valve member 14 to open valve 8 while holding the valve 9 closed. Conversely, clockwise rotation of spindle 5 opens the valve 9 and closes the valve 8.

It will be appreciated that fluid pressure in the exhaust chamber 6, which is at all times full of fluid, is less than the pressure in the intermediate chamber 12 which is in turn less than the inlet pressure in the inlet chamber 11. To prevent the higher pressure fluid in the intermediate chamber 12 from entering the exhaust chamber 6 past the valve member 14 of valve 8, a U-section packing seal 18 surrounds the valve member.

In use, the levelling valve is mounted on, say the sprung part of the vehicle and a linkage extends from the unsprung part to the operating spindle 2 so that a relative movement between the vehicle parts, due to changes in vehicle loading, effects rotation of the operating spindle. Usually the linkage includes lost-motion or damping means to absorb short term relative movements between the parts, due for example to uneven road surfaces or sudden acceleration or braking of the vehicle.

Furthermore, in the above described valve there is a clearance or lost motion connection between the operating spindle 2 and the portion 4 of the rockable spindle 5 to provide an operating delay before the spindle 5 is actuated. Thus the valve only operates in response to a long term change in vehicle loading.

When the vehicle is loaded, the operating spindle 2 is rotated clockwise to rotate the spindle 5 anti-clockwise and operate the valve 8. The fluid pressure in the strut is thus increased until the sprung and unsprung parts of the vehicle assume their normal relative positions and thereby return the spindles 2 and 5 to their illustrated, inoperative positions. Unloading of the vehicle causes the valve 9 to be operated to release the strut pressure into the exhaust chamber 6 until the vehicle parts again assume their normal relative positions.

It will be seen that the above described valve has the advantages that the operating delay is determined by the clearance between the operating spindle 2 and the portion 4 of the spindle 5 and by the clearance between the spindle 5 and the valve members 14, 14A which is very small. Both of these clearances are easily controlled during manufacture of the valve parts.

The lever ratio between the valve members and the end portion 4 of spindle 5 provides a good mechanical advantage so that the torques on operating spindle 2 required to operate the valve are kept at low levels.

Another advantage is that the operating spindle 2 and its seals are subjected to the relatively low pressure in the main exhaust chamber 6, so that the seal friction is kept to a minimum. Since the frictional losses are small, there is no significant change in operating delay of the valve due to changes in the frictional losses.

In an alternative embodiment, each of the apertures 16, 16A may have its cross sectional area decreasing gradually from both its ends to provide a peak intermediate the ends where the cross sectional area is smallest. The spindle 5 is pivotable on the peak.

The spindle 5 may be permanently engaged with each valve member, i.e. it may pass through each aperture without clearance.

Figure 2:
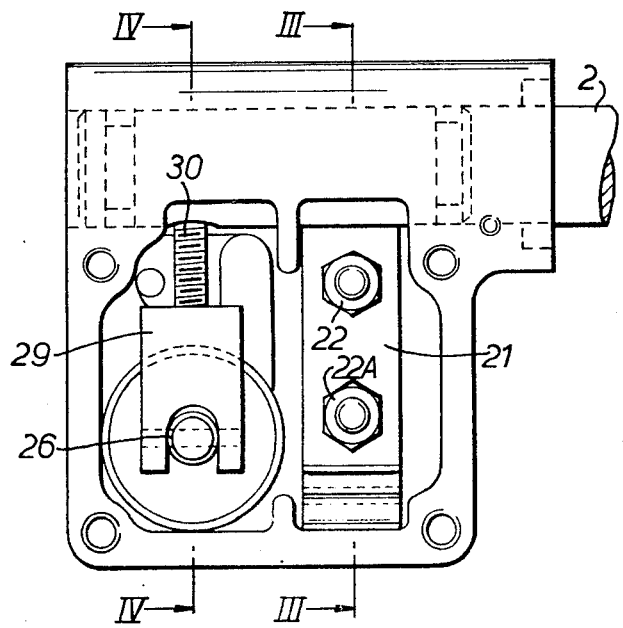
FIG. 2 is a plan view of the other embodiment with a cover removed.
Figure 3:
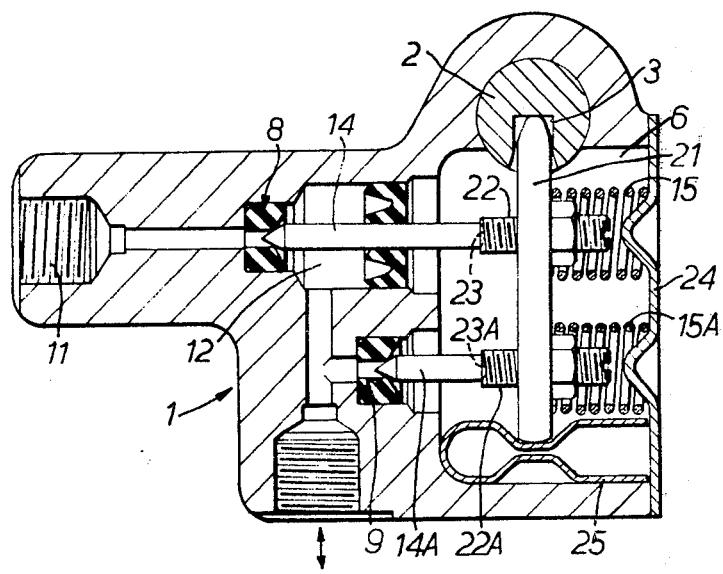
FIGS. 3 and 4 are sections taken on the lines III—III and IV—IV, respectively, of FIG. 2.
Figure 4:
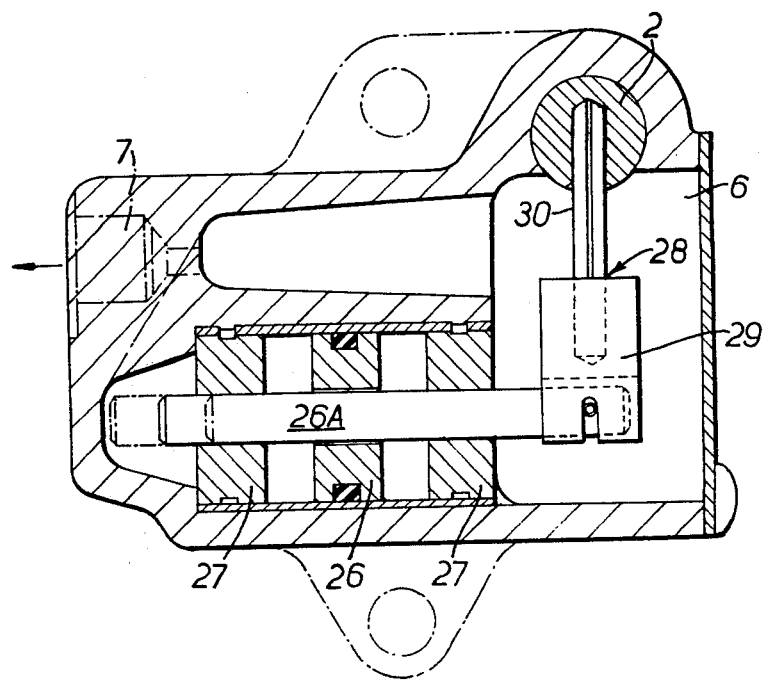

The embodiment of FIGS. 2 to 4 is generally similar to that of FIG. 1 and the same reference numerals are used to denote corresponding parts. In this embodiment the rockable operating member is constituted by a plate 21 carrying two adjustable struts 22,22A each having a recess in one end receiving a rounded end 23,23A of the associated valve member 14,14A. The valve members are biased to their valve closed positions by the respective springs 15,15A acting between the cover 24 and the plate 21. A further spring 25 urges the plate 21 into the recess 3 in the operating spindle 2.

This embodiment includes an internal damping means comprising a reciprocable damping piston 26 connected intermediate the ends of a piston rod 26A slidable in rod guides 27, the piston rod 26A being pivotally coupled at one end to an operating arm 28 comprising a yoke member 29 and a connecting rod 30. The rod 30 is in the form of a roll pin i.e. a tubular member having a longitudinal slit, forced into apertures in the yoke member and the operating spindle 2, respectively. Rotational movement of the spindle 2 is damped by movement of the damping piston 26.

Operation of the valve illustrated in FIGS. 2 to 4 is generally the same as that of FIG. 1 and need not be further described.

It will be appreciated that in each embodiment the amount of clearance between the rockable members 5, 21 and the operating spindle 2 is important. If there is too little clearance the levelling valve will operate satisfactorily, but the inlet and exhaust valves will continually open and close causing rapid wear of the valve parts. On the other hand, if there is too great a clearance the levelling valve will only operate when there are large changes in vehicle loading.

The embodiments of FIG. 1 preferably also has an internal damping means.

I claim:

1. A levelling valve for a vehicle suspension system having an adjustable suspension member, comprising an inlet for connection to a source of pressure fluid, means defining an intermediate chamber adapted to be connected to said vehicle suspension member, an inlet valve for controlling the flow of pressure fluid from said inlet to said intermediate chamber, an exhaust valve for controlling the flow of pressure fluid from said intermediate chamber, said valves including respective valve operating members movable to open and close said valves and valve operating means including a movable member arranged to operate each of said inlet and exhaust valves, said movable member being pivotable with respect to said valve operating members of the respective valves, such pivoting with respect to either one valve operating member effecting movement of the other valve operating member to a valve open position.

2. A levelling valve according to claim 1, wherein said movable member is rockably supported and movable between a first operative position in which said inlet valve is open and said exhaust valve is closed and a second operative position in which said exhaust valve is open and said inlet valve is closed through a normal intermediate position in which both said valves are closed.

3. A levelling valve according to claim 1, wherein said operating means includes an input member, and wherein said movable member is elongate and is engageable at one end with said input member, at the other end with one of said valve operating members and intermediate its ends with the other of said valve operating members to provide a predetermined mechanical lever ratio.

4. A levelling valve according to claim 3, wherein said input member comprises a shaft mounted for rotation and defining an opening therein receiving said one end of said movable member whereby, in operation, rotation of said shaft rocks said movable member to operate one of said valves.

5. A levelling valve according to claim 4, wherein said one end of said movable member fits into said opening with predetermined clearance to permit a predetermined rotation of said shaft to take place without corresponding movement of said movable member.

6. A levelling valve according to claim 1, wherein said inlet valve and said exhaust valve are needle valves.

7. A levelling valve according to claim 1, further including means defining an exhaust chamber, wherein said exhaust valve controls the flow of fluid from said intermediate chamber to said exhaust chamber, and wherein said movable member is positioned in said exhaust chamber.

8. A levelling valve according to claim 1, wherein the valve operating members define respective apertures, said movable member extending through said apertures so as to be pivotable with respect to said operating members.

9. A levelling valve according to claim 8, wherein each aperture has an inwardly directed projection on its surface, said movable member being pivotable on the projections.

10. A levelling valve according to claim 8 wherein said movable member passes through the apertures with predetermined clearances.

11. A levelling valve according to claim 1 including means resiliently biasing each said valve to its closed position, the biasing force of said resilient means being transmitted to said valve operating members by said movable member.

12. A levelling valve according to claim 1, wherein means are provided for adjusting the position of each said valve operating member relative to said movable member.

13. A levelling valve according to claim 1, wherein each valve operating member comprises a rod having a part spherical portion for engaging said movable member.

14. A levelling valve according to claim 4 including resilient biasing means resiliently urging said movable member into said opening in said shaft.

15. A levelling valve for a vehicle suspension system having an adjustable suspension member, comprising an inlet for connection to a source of pressure fluid, means defining an intermediate chamber adapted to be connected to said vehicle suspension member, means defining an exhaust chamber communicating with said intermediate chamber, an inlet valve for controlling the flow of pressure fluid from said inlet to said intermediate chamber, an exhaust valve for controlling the flow of pressure fluid from said intermediate chamber to said exhaust chamber, and valve operating means including a movable member subjected to the fluid pressure in said exhaust chamber and arranged to operate each of said inlet and exhaust valves.

* * * * *